United States Patent [19]

Yamaguchi

[11] Patent Number: 4,641,721
[45] Date of Patent: Feb. 10, 1987

[54] MOTORCYCLE

[75] Inventor: Ken Yamaguchi, Hidakamachi, Japan

[73] Assignee: Honda Giken Kogyo Kabushiki Kaisha, Japan

[21] Appl. No.: 780,579

[22] Filed: Sep. 26, 1985

[30] Foreign Application Priority Data

Oct. 5, 1984 [JP] Japan ............... 59-151062[U]

[51] Int. Cl.⁴ .................................... B60K 11/04
[52] U.S. Cl. ......................... 180/229; 180/68.4
[58] Field of Search ............ 180/229, 68.4; 165/41, 165/44

[56] References Cited

U.S. PATENT DOCUMENTS

| 1,648,804 | 11/1927 | Griese | 180/68.4 |
| 3,970,164 | 7/1976 | Suzuki | 180/68.4 |
| 4,287,961 | 9/1981 | Steiger | 180/68.4 |
| 4,478,306 | 10/1984 | Tagami | 180/229 |
| 4,541,645 | 9/1985 | Foeldesi | 180/68.4 |

FOREIGN PATENT DOCUMENTS 58-8427  1/1983  Japan ........................ 180/229
313713   9/1971  U.S.S.R. ................... 180/68.4

Primary Examiner—John A. Pekar
Attorney, Agent, or Firm—Darby & Darby

[57] ABSTRACT

A motorcycle includes a frame and a front fork connected to the frame and disposed in opposed relation to the front portion of the frame, and an engine mounted on the frame. A radiator is connectable to a fluid circulating system operatively associated with the engine for cooling a fluid flowing through the circulating system. The radiator includes a generally vertically-disposed body pivotally connected at an upper portion thereof to the front portion of the frame for angular movement between an operative position where the radiator body is disposed adjacent to the front portion of the frame and an inoperative position where the radiator body is away from the front portion. Retaining means is formed on the front portion of the frame and disposed at a level lower than the upper portion of the radiator body, the retaining means being engageable with the radiator body when the radiator body is in its operative position to releaseably hold the radiator body against angular movement.

3 Claims, 6 Drawing Figures

MOTORCYCLE

BACKGROUND OF THE INVENTION

1. Field of the Invention

This invention relates to a motorcycle or the like in which a radiator is mounted on the front of a frame in opposed relation to a front fork.

2. Prior Art

Conventionally, a motorcycle or the like is equipped with a radiator for transferring heat from a circulating fluid, such as a cooling water of a cooling water circulation system of the engine or a lubricating oil of the engine, to the environment. The radiator is mounted on the front of a frame in opposed relation of a front fork and therefore is disposed forwardly of the engine so that the air can be applied to the radiator as directly as possible without being interrupted by the component parts of the motorcycle to achieve a good cooling efficiency. Since the radiator is disposed immediately adjacent to the engine, it has been necessary to remove the radiator from the frame each time the maintenance of the engine is carried out. This requires time and labor. And, this problem is serious particularly with a motorcycle or the like comprising an engine such as a V-type engine of which cylinder projects considerably forwardly of the front of the frame, since there is little space available between the engine and the radiator. This further makes the maintenance operation of the engine difficult. In addition, connecting tubes connecting the radiator to the engine must be detached from the radiator each time the radiator is removed from the frame. As a result, the circulating fluid such as cooling water in the radiator flows therefrom and is wasted.

SUMMARY OF THE INVENTION

It is therefore an object of this invention to provide a motorcycle of the type in which there is available a sufficient space between the engine and the radiator to carry out a maintenance operation of the engine easily.

Another object is to provide such a motorcycle in which the fluid remaining in the radiator is prevented from flowing therefrom at the time of the maintenance of the engine.

According to the present invention, there is provided a motorcycle comprising:

(a) a frame having a front portion;

(b) a front fork connected to said frame for supporting a front wheel and disposed in opposed relation to said front portion of said frame;

(c) an engine mounted on said frame;

(d) a radiator for connection to a fluid circulating system operatively associated with said engine for cooling a fluid flowing through said circulating system, said radiator including a generally vertically-disposed body pivotally connected at an upper portion thereof to said front portion of said frame for angular movement between an operative position where said radiator body is disposed adjacent to said front portion of said frame and an inoperative position where said radiator body is away from said front portion; and (e) retaining means formed on said front portion of said frame and disposed at a level lower than said upper portion of said radiator body, said retaining means being engageable with said radiator body when said radiator body is in its operative position to releaseably hold said radiator body against angular movement.

DESCRIPTION OF THE PREFERRED EMBODIMENTS OF THE INVENTION

Figure 1:
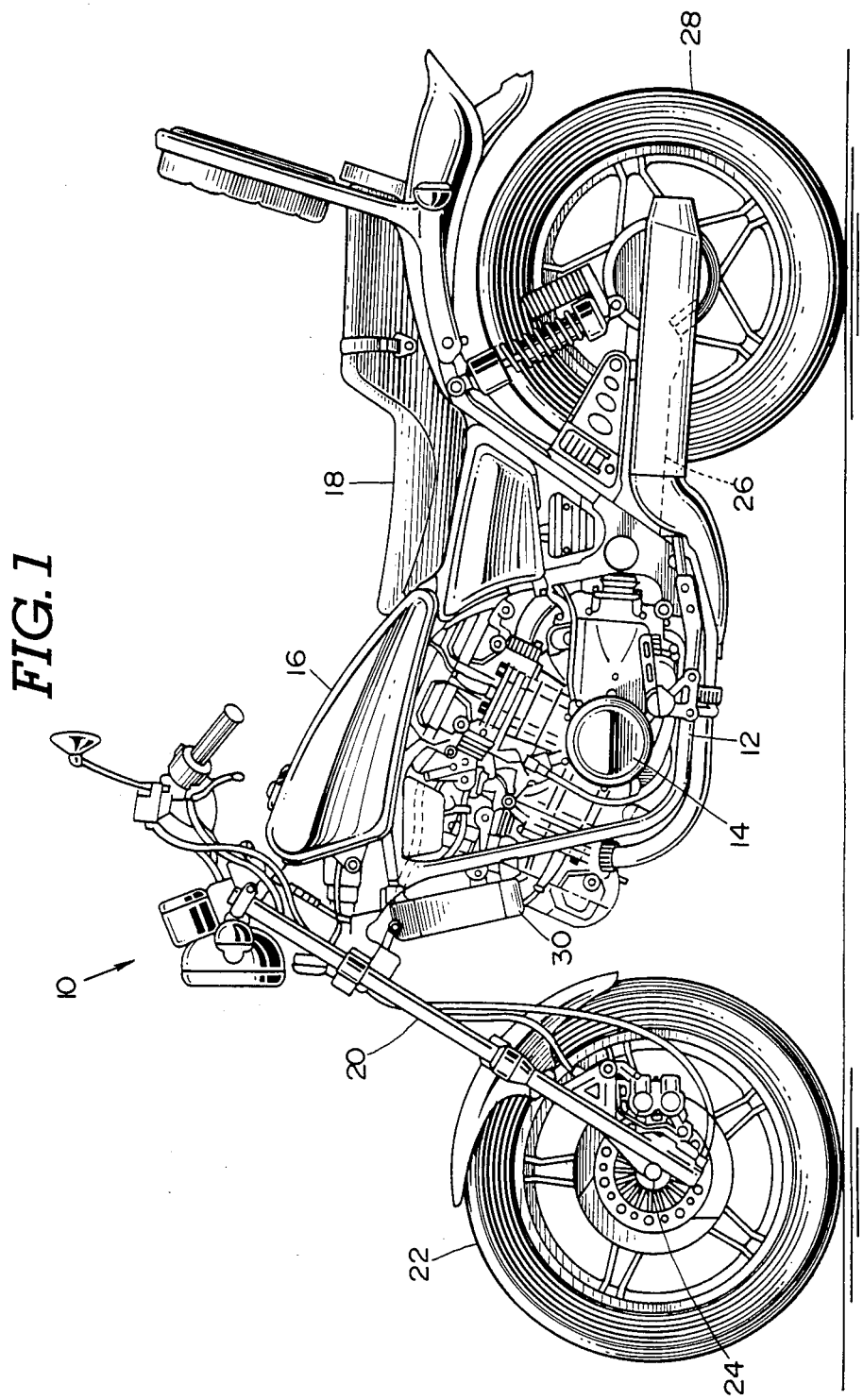
FIG. 1 is a side-elevational view of a motorcycle provided in accordance with the present invention.

FIG. 1 shows a motorcycle 10 comprising a frame 12, an engine 14 mounted on the frame 12, a fuel tank 16 mounted on the frame 12 above the engine 14, a seat 18 mounted on the frame 12, a front fork 20 connected to the frame 12 and supporting a front wheel 22 through a front axle 24, a rear fork 26 connected to the frame 12 and supporting a rear wheel 28 through a rear axle (not shown). A radiator 30 is mounted on the front of the frame 12 in opposed relation to the front fork 20.

Figure 2:
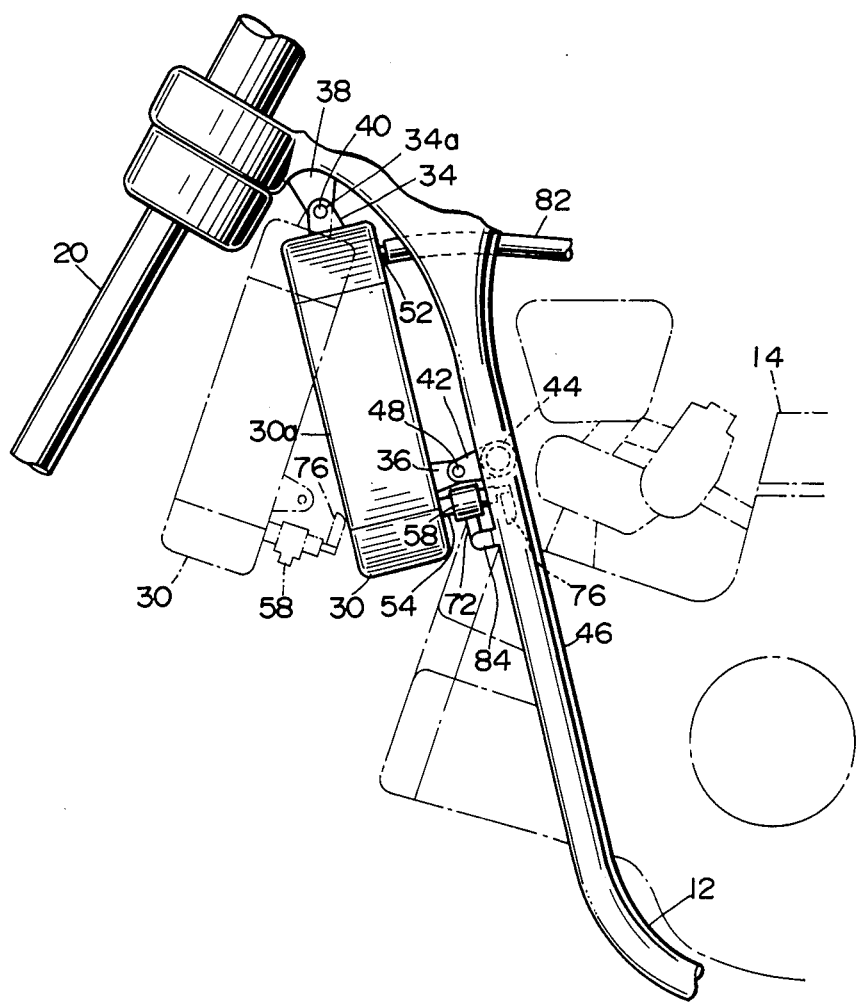
FIG. 2 is a fragmentary enlarged view of the motorcycle, showing a radiator.

As best shown in FIG. 2, the radiator 30 includes a rectangular body 30a having a pair of parallel closely spaced first brackets 34 formed on an upper end face thereof at a center thereof and a pair of parallel spaced second brackets 36 formed on a rear face thereof adjacent to a lower end thereof, only one of each of the first and second brackets 34 and 36 being shown in the drawings. A first mounting lug or bracket 38 is formed on the front end portion of the frame 12 at a lower surface thereof. An aperture (not shown) is formed through the first mounting lug 38, and the pair of first brackets 34 have aligned apertures 34a formed therethrough. The first mounting lug 38 is received in a space defined by the pair of first brackets 34, and a first connecting pin 40 passes through the apertures 34a of the brackets 34 and the aperture of the first lug 38, so that the radiator body 30a is pivotable or angularly movable about the connecting pin 40 toward and away from the the front of the frame 12, that is, between an operative position indicated in solid lines in FIG. 2 and an inoperative position indicated in dot-and-dash lines.

A pair of parallel spaced second mounting lugs or brackets 42, serving as retaining members, are formed on a reinforcement tube 44 extending generally horizontally between a pair of spaced down tubes 46 of the frame 12, only one of the brackets 42 being shown in the drawings. Each of the second mounting lug 42 has an aperture 42a (FIG. 3) formed therethrough, and each of the second brackets 36 has an aperture 36a formed therethrough. Each of the second brackets 36 is mated with a respective one of the second mounting lugs 42, and a second connecting pin 48 passes through the aligned apertures 36a and 42a of each mated second bracket 36 and second mounting lug 42 to hold the radiator body 30 against angular movement about the first connecting pin 40 in its operative position where the radiator body 30a is disposed in closely opposed relation to the down tubes 46 of the frame 12. The connecting pin 48 is removably received in the aligned apertures 36a and 42a.

Figure 4:
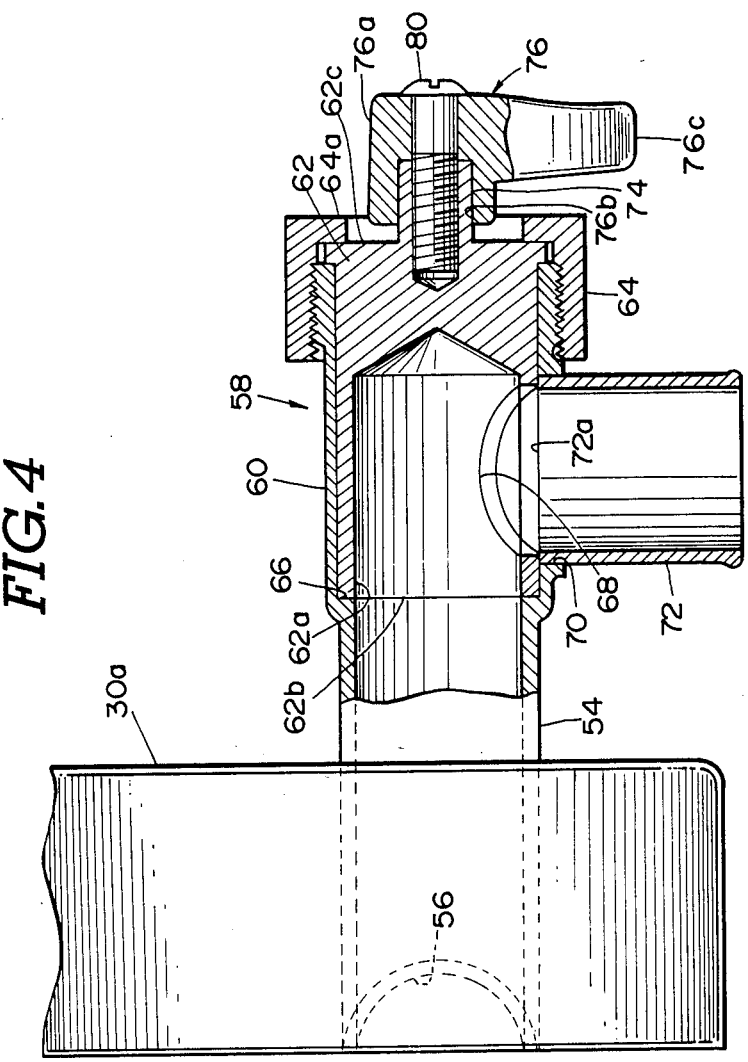
FIG. 4 is a fragmentary enlarged view of the radiator, showing a valve associated therewith.

The radiator 30 includes an inlet fitting 52 secured to the radiator body 30a and extending from the rear face of the radiator body 30a adjacent to the upper end face thereof and one side face thereof (not shown), the inlet fitting 52 being in communication with an inlet port (not shown) of the radiator 30 for introducing the circulating liquid thereinto as later described. As best shown in FIG. 4, an outlet tubular member 54 is secured to the radiator body 30a and extends from the rear face adjacent to the lower end thereof and the other side face thereof, the tubular outlet member 54 communicating with an outlet port 56 of the radiator 30 for discharging the circulating liquid therefrom.

A shut-off valve 58 is provided for shutting off the flow of the circulating liquid through the outlet tubular member 54. The valve 58 comprises a tubular valve body 60 defined by the outer portion of the tubular outlet member 54 having a slightly enlarged diameter, a cylindrical valve element 62 fitted in the valve body 60 for rotation about an axis thereof, and a tubular retaining member 64 threaded on the distal end of the valve body 60 and having an inwardly-directed peripheral flange 64a held against the outer end of the valve element 62 while the inner end of the valve element 62 is held against an annular shoulder 66 formed on the inner surface of the valve body at an inner end thereof, so that the valve element 62 is held against axial movement. The valve element 62 has a cylindrical bore 62a extending along the axis thereof and has an open inner end 62b which communicates with the outlet port 56 of the radiator 30 via the tubular outlet member 54. An opening 68 is formed through the peripheral wall of the valve element 62, and the valve body 60 has an opening 70 formed through the peripheral wall thereof. A fitting 72 is sealingly fitted in the opening 70, the inner end 72a of the fitting 72 serving as a valve outlet port. A projection 74 of a square cross-section is formed integrally on the outer end face 62c of the valve element 62 at its center and extends outwardly of the peripheral flange 64a of the retaining member 64. A lever 76 has a socket portion 76a having a square bore 76b in which the projection 74 is snugly fitted, and a lever portion 76c extending perpendicularly from the axis of the socket portion 76a. The lever 76 is secured to the valve element 62 by a bolt 80 passing through the socket portion 76a into the projection 74.

The valve element 62 is moved between its closed and open positions by manipulating the lever 76 to be angularly moved about the bolt 80 through 180°. More specifically, in the closed position of the valve 58 where the inner end 72a of the fitting 72 is closed by the outer peripheral surface of the valve element 62, so that the communication of the bore 62a with the fitting 72 is interrupted, the lever portion 76c is directed vertically upwardly. And, in the open position of the valve 58 where the opening 68 of the valve element 62 is disposed in registry with the inner end 72a of the fitting 72 to communicate the bore 62a with the fitting 70, the lever portion 76c is directed vertically downwardly, and the lever 76 is disposed below the transverse reinforcement tube 44 in slightly spaced relation thereto.

A first connecting tube 82 is fitted on the inlet fitting 52 at one end thereof while the other end is connected a cylinder water jacket (not shown) of a cooling water circulation system for the engine 14. A second connecting tube 84 is removably fitted on the fitting 72 at one end while the other end is secured to one of the down tubes 46 and is in communication with a passageway defined by the internal bore of part of the down tube 46, the passageway being also in communication with a water pump (not shown) of the cooling water circulation system. With this arrangement, during the operation of the engine 14 with the radiator 30 disposed in its operative position, the cooling water circulating through the cooling water circulation system is introduced into the radiator 30 via the inlet fitting 52 and discharged therefrom via the outlet tubular member 54 and is then fed to the fitting 72 via the valve 58.

When it is desired to bring the radiator 30 to its inoperative position to carry out the maintenance of the engine 14 or the like, the second connecting pin 48 is first removed from each mated second bracket 36 and second mounting lug 42 to disconnect them. Then, the radiator 30 is slightly angularly moved about the first connecting pin 40 in a direction away from the down tubes 46. Then, the lever 76 is angularly moved about the bolt 80 through 180° from its downwardly-directed position to its upwardly-directed position to bring the valve 58 from its open to closed positions. Then, the second connecting tube 84 is detached from the fitting 72. Then, the radiator 30 is further angularly moved about the first connecting pin 40 to its inoperative position, so that a sufficient space is available between the front of the engine 14 and the radiator 30 to provide an easy access to the front of the engine 14. Thus, the maintenance of the engine 14 can be easily carried out. In addition, by virtue of the provision of the valve 58, the cooling water remaining in the radiator 30 is not caused to flow therefrom upon detachment of the second connecting tube 84 from the fitting 72.

Figure 3:
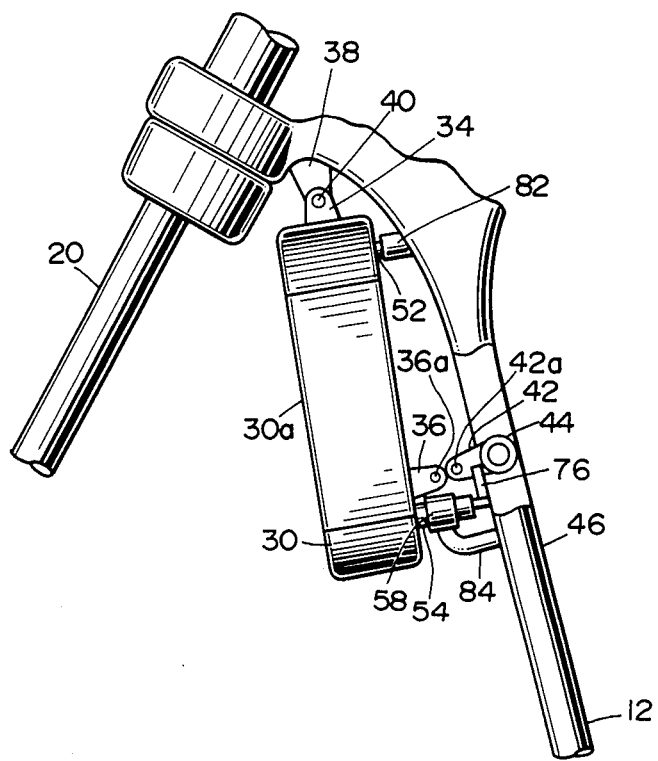
FIG. 3 is a view similar to FIG. 2 but showing the radiator out of its operative position.

The reassembly can be carried out by reversing the above procedure. In this embodiment, when the radiator 30 is brought from its inoperative to operative positions, the upwardly-directed lever portion 76c is brought into engagement with the reinforcement tube 44, serving as engaging means, immediately before the radiator 30 reaches its operative position, as best shown in FIG. 3. This prevents the operator from forgetting to return the valve 58 from its closed to open positions. Thus, the reinforcement tube 44 serves as a valve-opening reminder means.

Figure 5:
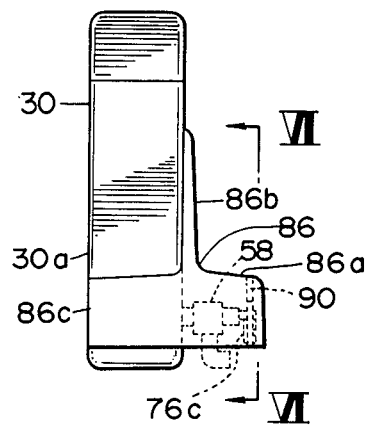
FIG. 5 is a side-elevational view of the radiator incorporating a cover member.
Figure 6:
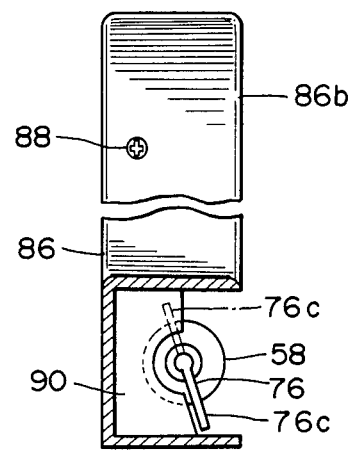
FIG. 6 is a view as viewed along the line VI—VI of FIG. 5.

FIGS. 5 and 6 show a modified valve-opening reminder means which comprises a cover member 86 removably attached to the radiator body 30a to cover the valve 58. The cover member 86 has a hollow portion 86a for accommodating the valve 58 and the lever 76, and a pair of first and second arms 86b and 86c extending from the hollow portion 86a and disposed generally perpendicularly with each other. The first arm 86b is held against the rear face of the radiator body 30a, and the second arm 86c is held against the side face thereof, and the cover member 86 is secured to the radiator body 30a by a screw 88 threaded through the first arm 86b into the body 30a. An integral registration plate 90 is provided in the hollow portion 86a and disposed in a plane in which the lever portion 76c is angularly movable. In the open position of the valve 58, the downwardly-directed lever portion 76c is disposed in registry with and adjacent to a lower portion 92a of a generally-vertically disposed edge 90 of the registration plate 90 in opposed relation thereto. For bringing the radiator 30 from its operative to inoperative positions, the cover member 86 is detached from the radiator body 30a by removing the screw 88 therefrom. Subsequently, the lever portion 76a is angularly moved in a clockwise direction (FIG. 6) to its upwardly-directed position to close the valve 58. If the lever 76 is not returned to its downwardly-directed position to open the valve 58 after the radiator 30 is returned from its inoperative to operative position, the cover member 86 is displaced out of position with respect to the radiator body 30a since the lever 76 engages the registration plate 90. In this condition, the screw 88 can not be threaded into the radiator body 30a. This naturally reminds the operator that the valve 58 should be opened. The provision of the cover member 86 also prevents the valve 58 from being inadvertently moved from its open to closed positions.

While the motorcycle according to the invention has been specifically shown and described herein, the invention itself is not to be restricted by the exact showing of the drawings or the description thereof. For example, the valve 58 may be of any suitable type such as a one-way valve and an automatic shut-off valve which is automatically brought into a closed condition when it is disconnected from the connecting tube 84. Also, the invention can be applied to a motorcycle having one front wheel and two rear wheels.

What is claimed is:

1. A motorcycle comprising:
   a frame having a front portion;
   a front fork connected to said frame for supporting a front wheel and disposed in opposed relation to said front portion of said frame;
   an engine mounted on said frame;
   a radiator for connection to a fluid circulating system operatively associated with said engine for cooling a circulating fluid flowing through said circulating system, said radiator including a generally vertically-disposed body pivotally connected at an upper portion thereof to said front portion of said frame for angular movement between an operative position where said radiator body is disposed adjacent to said front portion of said frame and an inoperative position where said radiator body is away from said front portion, said radiator having an inlet for introducing said circulating fluid thereinto and an outlet for discharging said circulating fluid therefrom;
   retaining means formed on said front portion of said frame and disposed at a level lower than said upper portion of said radiator body, said retaining means being engageable with said radiator body when said radiator body is in its operative position to releasably hold said radiator body against angular movement; and
   a valve operatively connected to said outlet and operable to be closed to prevent said fluid from flowing therethrough.

2. A motorcycle according to claim 1, in which said front portion of said frame has an engaging means, and wherein said valve includes a hollow valve body having an outlet port, a valve element mounted within said valve body for movement between a closed position where said valve element closes said outlet port and an open position where said valve element opens said outlet port, and a lever secured to said valve element and movable between a first position to bring said valve element to its closed position and a second position to bring said valve element to its open position, said lever being engageable in its first position with said engaging means when said radiator body is moved from its inoperative position to its operative position.

3. A motorcycle according to claim 1, wherein said valve includes a hollow valve body having an outlet port, a valve element mounted within said valve body for movement between a closed position where said valve element closes said outlet port and an open position where said valve element opens said outlet port, and a lever secured to said valve element and movable in a plane between a first position to bring said valve element to its closed position and a second position to bring said valve element to its open position; and wherein the motorcycle further comprises a cover member removably attached to said radiator body and covering said valve, said cover member having a registration plate disposed in the plane in which said lever is movable, said registration plate having an edge disposed adjacent to said lever in opposed relation thereto when said lever is in its second position.

* * * * *